United States Patent [19]

Muller

[11] Patent Number: 4,891,642
[45] Date of Patent: Jan. 2, 1990

[54] WIND SHEAR DETECTION SYSTEM
[75] Inventor: Hans R. Muller, Redmond, Wash.
[73] Assignee: Sundstrand Data Control, Inc., Redmond, Wash.
[21] Appl. No.: 142,463
[22] Filed: Jan. 11, 1988
[51] Int. Cl.[4] .............................................. G08B 23/00
[52] U.S. Cl. ........................................ 340/968; 73/7; 244/181; 340/963; 364/433
[58] Field of Search ............... 340/963, 968, 967, 969, 340/970; 73/178 R, 178 T; 244/181, 182, 191; 364/428, 427, 433–435

[56] References Cited

U.S. PATENT DOCUMENTS

| | | | |
|---|---|---|---|
| 4,012,713 | 3/1977 | Greene et al. | 340/968 |
| 4,079,905 | 3/1978 | Greene | 340/968 |
| 4,281,383 | 7/1981 | Lebrun | 340/968 |
| 4,373,184 | 2/1983 | Lambregts | 244/196 |
| 4,413,321 | 11/1983 | Lebrun | 364/434 |
| 4,593,285 | 6/1986 | Miller et al. | 340/968 |
| 4,725,811 | 2/1988 | Muller et al. | 340/963 |
| 4,728,951 | 3/1988 | Johnson et al. | 340/968 |
| 4,763,266 | 8/1988 | Schultz et al. | 340/968 |
| 4,797,674 | 1/1989 | Zweifel et al. | 340/967 |

Primary Examiner—Joseph A. Orsino
Assistant Examiner—Brent A. Swarthout
Attorney, Agent, or Firm—Mason, Kolehmainen, Rathburn & Wyss

[57] ABSTRACT

A wind shear detection system compares air-speed with a composite signal derived from signals representative of longitudinal acceleration, normal acceleration, angle of attack and flight path angle to generate a shear signal. An enhanced version of the system is also compensated for roll angle, radio altitude and flap position. In a modified system, the accelerations are calculated along the velocity vector of the aircraft rather than along the horizontal axis to compensate for inaccuracies that could occur under extreme flight conditions such as high bank angle turns and dynamic maneuvers.

15 Claims, 2 Drawing Sheets

WIND SHEAR DETECTION SYSTEM

CROSS REFERENCE TO RELATED APPLICATION

This application is related to copending U.S. patent application Ser. No. 06/829,731 filed Feb. 13, 1987, now U.S. Pat. No. 4,725,811, and incorporated herein by reference.

BACKGROUND OF THE INVENTION

1. Field of the Invention

This invention relates generally to wind shear detection systems, and more particularly to airborne wind shear detection systems for alerting the pilot of a wind shear condition if the aircraft penetrates a wind shear condition of sufficient force to pose a hazard to the aircraft.

2. Description of the Prior Art

Various wind shear detection systems are known. Among these include ground based systems such as systems that utilize a plurality of wind speed and direction measuring stations placed about an airport in conjunction with a system for analyzing the magnitude and direction of the wind at the various stations to provide an indication of a wind shear condition. Other ground based systems utilize Doppler radar located at airports.

Airborne systems are also known. Among such systems are systems that compare airmass derived parameters such as airspeed with ground speed derived from a radar system. In the event of a rapid change in airspeed relative to ground speed, a wind shear condition is indicated. Other systems compare airmass derived signals with inertially derived signals to generate a signal representative of wind shear when the rate of change of inertially derived parameters varies from the rate of change of airmass derived parameters by a predetermined amount. Two such systems are disclosed in U.S. Pat. Nos. 4,012,713 and 4,079,905. Both of these patents disclose systems that compare a longitudinal accelerometer signal that has been corrected for the effect of gravity with an airspeed rate signal and provide a wind shear signal when the difference between the accelerometer derived acceleration signals and the airmass derived rate signals exceeds a predetermined amount. The '905 patent also takes into account a downdraft drift angle that is a function of vertical acceleration and air-speed rate. Still other systems monitor the rate of change of deviation from a glide slope beam or an ILS beam to provide a signal representative of wind shear. The system disclosed in the above-mentioned copending application Ser. No. 06/829,731, now U.S. Pat. No. 4,725,811, compares a rate of change of airspeed signal with a composite signal derived from inertially derived and airmass derived signals and does not require the inertial gravity correction utilized by the systems contemplated by the '713 and '905 patents.

While all of these systems provide some indication of wind shear, the ground based systems are responsive only to conditions in the vicinity where the transducers are placed, and are not responsive to dangerous types of wind shear such as microbursts which form and dissipate rapidly.

While airborne wind shear protection systems are more responsive to conditions in the vicinity of the aircraft than are ground based systems, many of them require Doppler radar or signals such as inertial navigation signals, glide slope signals and other signals that are not available on older aircraft. Also, the airspeed rate signals utilized by the airborne systems tend to be noisy because they are obtained by differentiating an airspeed signal. The nature of the differentiation process is to emphasize rapid changes in the signal applied to the differentiator. Consequently, short term components of the airspeed signal that are not related to wind shear produce large peaks in the airspeed rate signal. Such peaks must be limited, filtered or otherwise processed to avoid nuisance warnings. In addition, the prior art systems calculate wind shear along the longitudinal and normal axes of the aircraft or along the horizontal and vertical coordinates of the earth. This can result in errors during high bank angle turns and other dynamic maneuvers.

SUMMARY OF THE INVENTION

Thus, it is an object of the present invention to provide a wind shear detection system that overcomes many of the disadvantages of the prior art systems.

It is yet another object of the present invention to provide a wind shear detection system that utilizes signals that are present in most aircraft.

It is yet another object of the present invention to provide a wind shear detection system that does not require the use of an airspeed rate signal.

It is yet another object of the present invention to provide a wind shear detection system that maintains its accuracy under extreme flight conditions such as high bank angle turns and other dynamic maneuvers.

It is yet another object of the present invention to calculate wind shear along the velocity vector of the aircraft.

Thus, in accordance with a preferred embodiment of the invention, there is provided a wind shear detection system that requires only normal and longitudinal accelerometer signals, an angle of attack vane signal, a vertical speed signal and an airspeed signal from the aircraft. These signals are employed in a shear equation that utilizes longitudinal acceleration, normal acceleration, angle of attack, flight path angle and airspeed to generate a number that is a function of the aforesaid variables and provides an indication of wind shear. In addition, the wind shear may be compensated for the effects of roll and sideslip. Also, by making the wind shear calculations along the velocity vector of the aircraft rather than along the other coordinates, errors due to extreme maneuvers are minimized.

DESCRIPTION OF THE DRAWING

These and other objects and advantages of the present invention will become readily apparent upon consideration of the following detailed description and attached drawing, wherein.

DETAILED DESCRIPTION

Figures 1, 2:
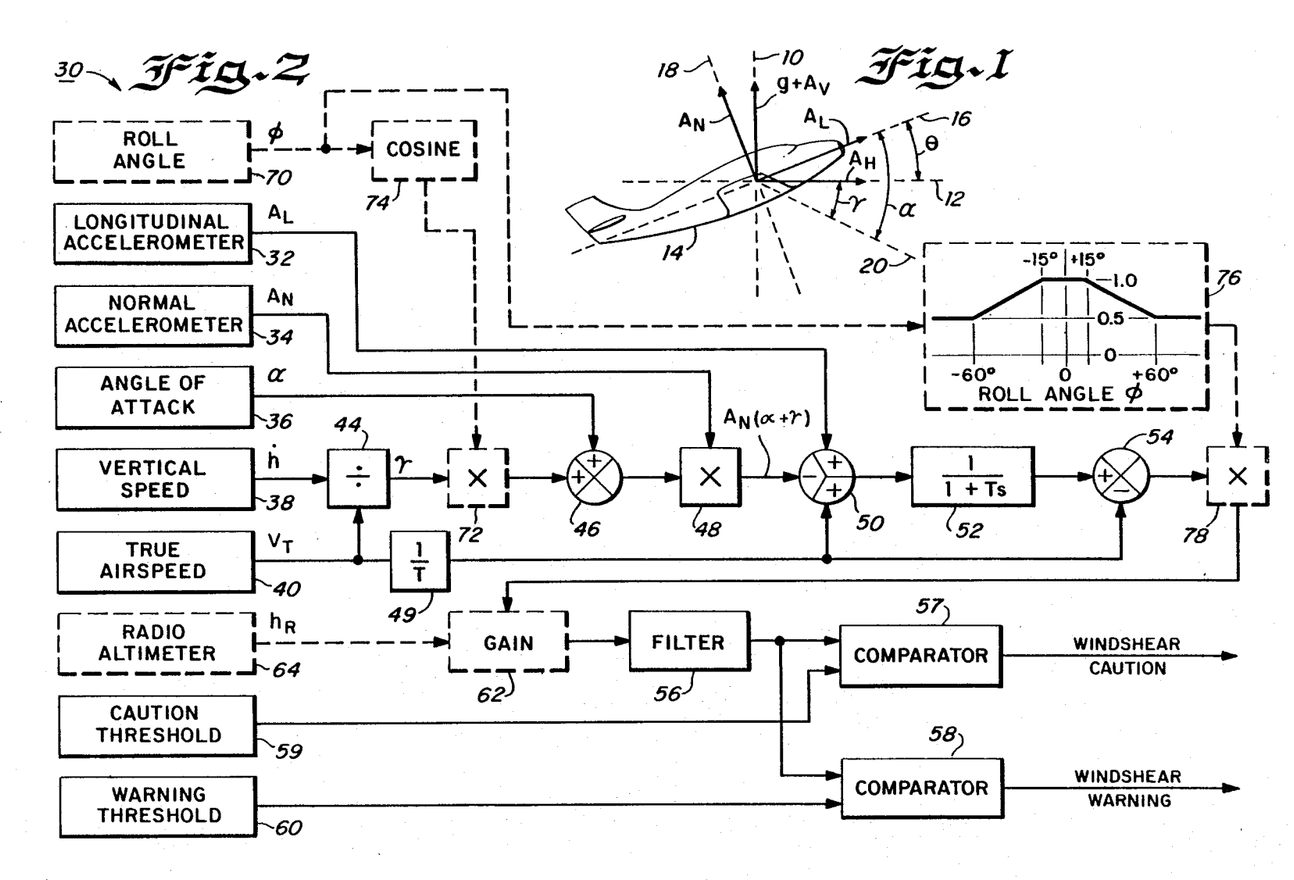
FIG. 1 is a vector diagram illustrating the relationship between various parameters used in detecting a wind shear condition.
FIG. 2 is a block diagram illustrating the basic principles of operation of the system according to the invention.

In the description of the present invention, various accelerations such as longitudinal acceleration, normal acceleration and various angles such as pitch angle, flight path angle, etc., will be discussed, and these angles and accelerations are illustrated in FIG. 1. Throughout the discussion herein, it should be understood that the term "inertial acceleration signal" can refer to related signals other than pure inertial acceleration signals, such as an inertially derived signal, derived from both inertial and non-inertial transducers.

Referring to FIG. 1, there is shown a pair of horizontal and vertical coordinates designated by the reference numerals 10 and 12, respectively. A representation of an aircraft 14 is also shown in FIG. 1, and a pair of vectors 16 and 18 represent the longitudinal and normal axes of the body of the aircraft, with the vector 16 passing through the longitudinal center line of the aircraft and the vector 18 being perpendicular to the vector 16. A dashed line 20 represents the flight path of the aircraft, and in the illustration of FIG. 1 represents a descending flight path.

The angle between the horizontal axis 12 and the longitudinal axis 16 of the aircraft is defined as the pitch angle and represented by the symbol 8. The angle between the flight path 20 and the horizontal reference 12 is defined as the flight path angle and is represented by the symbol $\gamma$. The angle between the longitudinal axis of the aircraft 16 and the flight path 20 is known as the angle of attack of the aircraft and is represented by the symbol $\alpha$. The flight path angle $\gamma$ is negative for a descent and positive for ascent. Thus, the angle of attack $\alpha$ is equal the flight path angle $\gamma$ plus the pitch angle $\theta$.

In addition, various accelerations and accelerometer signals will be discussed. One such signal is a longitudinal accelerometer signal, $A_L$, which is the signal obtained from an accelerometer mounted parallel to the longitudinal axis 16 of the aircraft. The signal from the longitudinal accelerometer is a function of the longitudinal acceleration of the aircraft, and because of the influence of gravity, the pitch angle $\theta$. Another such signal is the normal accelerometer signal, $A_N$, which is the signal obtained from an accelerometer positioned parallel to the normal axis 18 of the aircraft. The normal accelerometer signal is a function of acceleration along the normal axis of the aircraft as well as gravity, pitch angle $\theta$ and roll angle $\phi$. The roll angle $\phi$ is the angular deviation from horizontal about the longitudinal roll axis of the aircraft. Horizontal acceleration, $A_H$, is a signal representative of acceleration along the horizontal axis 12. An accelerometer mounted parallel to the horizontal axis 12 would provide the horizontal acceleration signal, $A_H$. Finally, a vertical acceleration signal, $A_V$, is a signal representative of acceleration along the vertical axis 10. An accelerometer mounted parallel to the vertical axis V would provide a signal representative of the sum of any vertical acceleration and the effects of gravity, g, or 32.2 feet/second. A vertical gyro would provide signals representative of the pitch angle $\theta$ and the roll angle $\phi$.

Recapitulating the above, the various accelerations and angles to be considered are as follows:

$A_N$ = normal accelerometer signal;
$A_L$ = longitudinal accelerometer signal;
$A_H$ = horizontal acceleration;
$A_V$ = vertical acceleration;
g = gravitational constant = 32.2 feet/sec*sec;
$\alpha$ = angle of attack (AOA);
$\theta$ = pitch angle;
$\phi$ = roll angle;
$\gamma$ = flight path angle.

In determining some of the above parameters, other parameters may be required. These include:

$\dot{h}$ = vertical speed (which may be obtained as a Z-velocity signal from an inertial navigation system or a barometric altitude rate signal; and
v = airspeed (which may be a true airspeed signal $V_T$).

In the system according to the present invention, a wind shear representative signal is obtained by computing a composite signal based on inertially derived accelerations, angle of attack, flight path angle and vertical velocity, and comparing the computed signal with an airmass derived velocity signal such as true airspeed. The difference between the composite signal and the airmass derived velocity will be a measure of wind shear.

Because the present system does not employ a vertical gyro, and only normal and longitudinal accelerometer signals $A_N$ and $A_L$, are employed, the horizontal acceleration, $A_H$, must be computed. The computation is as follows:

(1) $A_L = A_H \cos \theta + (g + A_V) \sin \phi$
(2) $A_N = (g + A_V) \cos \phi - A_H \sin \phi$ Substituting the quantity $(g + A_V)$ from equation (2) into equation (1) we obtain:

$$A_L = \frac{A_H}{\cos \theta} + A_N \tan \theta \quad (3)$$

From equation (3) above, the horizontal acceleration, $A_H$, can be calculated if the pitch angle $\theta$ is known. However, to obtain the pitch angle directly, a vertical gyroscope is required. To avoid the need for a vertical gyroscope signal, the no-wind condition of the pitch angle being equal to the angle of attack plus flight path angle is utilized as follows:

(4) $\phi = \alpha + \gamma$

Utilizing this condition, the need for a vertical gyroscope is avoided and the system also becomes sensitive to vertical winds and up and down drafts because angle of attack and flight path angle do not add up to pitch in the presence of vertical wind.

Making small angle approximations that for small angles $\cos \phi = 1$ and $\tan \phi = \phi$ in radians, equation (3) becomes:

(5) $A_L = A_H + A_N(\phi)$

Rearranging terms to solve for horizontal acceleration, we obtain:

(6) $A_H = A_L - A_N(\phi)$

Utilizing the no-wind condition approximation for $\phi$, equation (6) becomes:

(7) $A_H = A_L - A_N(\alpha + \gamma)$

The $A_H$ signal is an acceleration signal which could be compared with an airmass derived airspeed rate signal to provide a shear signal, as is done in the above referenced application Ser. No. 06/829,731 filed Feb.

13, 1987, now U.S. Pat. No. 4,725,811. However, to avoid utilizing an airspeed rate signal, the $A_H$ signal is combined with an airmass derived velocity signal, v, which may be true airspeed, and integrated to provide a composite velocity signal derived from both airmass and inertially derived parameters. The composite velocity signal is then compared with an airmass derived airspeed signal (e.g., true airspeed) with the difference being representative of wind shear. Mathematically:

$$\text{shear} = \frac{A_L - A_N(\alpha + \gamma) + (v/T)}{1 + Ts} - (v/T) \quad (8)$$

where s is the LaPlace operator and T is the integration time constant.

A circuit for solving the shear equation (8) above is illustrated in FIG. 2, and generally designated by the reference numeral 30. Although the circuit is illustrated as a series of functional blocks for purposes of clarity, it should be understood that the system need not be implemented exactly as shown and that various analog and digital implementations are possible. The system 30 utilizes various inputs such as a signal from a longitudinal accelerometer 32 mounted parallel to the longitudinal axis of the aircraft, a normal accelerometer 34 mounted perpendicular to the longitudinal accelerometer 30 and an angle of attack circuit 36, which may include, for example, a vane extending laterally from the side of the aircraft that orients itself parallel to the local air flow past the vane. The angle of attack vane signal is combined with other parameters, such as, flap position signals as well as a constant peculiar to a particular aircraft to provide the angle of attack signal. In addition, a vertical speed signal source 38 provides a signal, h, representative of the vertical speed of the aircraft. Such a vertical speed signal may be obtained by differentiating a barometric altitude signal. An airspeed signal source 40 such as an airspeed transducer whose output has been compensated for environmental variations provide a signal representative of true airspeed, $V_T$, is also provided. Although two separate instruments are shown, the barometric altitude and airspeed data can be obtained from an air data computer, and the vertical velocity may be obtained from the Z-velocity output of an inertial navigation system. Also various airspeed signal sources may be employed, and consequently, a generalized term v, is employed in the following equations; however, $v_T$ may be substituted to v.

Because the flight path angle $\gamma$ cannot be obtained directly from any of the aforementioned transducers, the flight path angle $\gamma$ must be computed as follows:

(9) $\gamma = \arcsin(h/v)$ which for small angles becomes:

(10) $\gamma = h/v$, where $\gamma$ is in Radians.

Thus, by dividing the barometric rate signal, h, by the airspeed signal, v, for example, by means of a divider circuit 44 (FIG. 2), a signal representative of the flight path angle Y is obtained. During the initial portions of this discussion, the components shown by dashed lines will not be considered because they relate to optional features of the basic system. The flight path angle signal thus obtained is added to the body angle of attack signal derived from the angle of attack circuit 36 by a summing junction 46 to provide a signal representative of the sum of the angle of attack and flight path angle signals $(\alpha + \gamma)$. The vertical speed signal used for the computation of the flight path angle $(\gamma)$, essentially indicates inertial vertical speed, i.e., the actual vertical motion of the aircraft. Thus the resulting shear equation will also respond to vertical shears (e.g., up or down drafts) because the derived angle of attack $(\alpha)$ and the inertially derived flight path angle $(\gamma)$ do not add up to the pitch angle $(\phi)$ in the presence of up or down drafts. The output of the summing junction 46 is multiplied by the normal accelerometer signal in a multiplication circuit 48 to provide the $A_N(\alpha + \gamma)$ term. The airspeed signal from the airspeed transducer 40 is added to the longitudinal accelerometer signal (as filtered by a 1/T filter 49) by a summing junction 50 which also subtracts the $A_N(\alpha + \gamma)$ term from the sum of the airspeed and longitudinal accelerometer signals. The output of the summing junction 50 is filtered by an integrating filter 52 having a time constant, T, equal to, for example, one second. The output of the integrating filter 52 is compared with the true airspeed signal by a summing junction 54 to provide a "shear" signal. The "shear" signal may be applied to a display to indicate to the pilot the magnitude of shears being encountered by the aircraft, and may also be applied to one or more comparators such as the comparators 57 and 58 via a turbulence filter 56 to be compared with caution and warning threshold references from a pair of reference circuits 59 and 60 which provide signals representative of hazardous shear conditions of varying severities. In the event that the shear signal from the filter 56 exceeds one of the reference signals from the warning threshold reference circuits 59 or 60, the appropriate comparator will provide a signal to initiate a wind shear caution, or a wind shear warning in the event of a more dangerous shear condition.

The point at which the caution or warning is initiated may be varied as a function of the altitude of the aircraft above ground to provide an earlier warning at lower radio altitudes. This may be accomplished by means of a variable gain amplifier 62 whose gain is increased at low radio altitudes under the control of a radio altimeter 64 in order to provide an earlier warning at low radio altitudes.

As was discussed above, the normal accelerometer signal is a function not only of vertical acceleration, but also of pitch angle, particularly for large pitch angles. However, as previously stated, the normal accelerometer signal is also affected by the roll angle, $\phi$, of the aircraft. An approximate compensation for the effects of roll angle, $\phi$, may be obtained by multiplying the flight path angle, $\gamma$, by the cosine of the roll angle, $\phi$. Thus, the shear equation becomes;

$$\text{shear} = \frac{A_L - A_N(\alpha + \gamma)\cos\phi + (v/T)}{1 + Ts} - (v/T) \quad (11)$$

The roll angle compensation is provided in FIG. 2 by circuitry including a roll angle signal source 70 which may include a vertical gyro, a multiplier 72 and a cosine function generator 74 interposed between the roll angle signal generator 70 and the multiplier 72. Also, the roll angle may be used to alter the point at which a warning or caution is given in order to reduce nuisance warnings at relatively high roll angles. If an aircraft is in a turn, for example, a 180 degree turn from an initial heading into the wind to a tailwind heading, the change in apparent wind direction could be interpreted as a wind shear, and a nuisance warning could be generated. However, when an aircraft executes such a maneuver, the aircraft generally assumes a roll attitude. By measuring the roll angle and desensitizing the wind shear warning system whenever the aircraft is in a roll attitude, such nuisances can be minimized. The desensitization function is accomplished by a function generator and a multiplier 78 that operates on the "shear" signal to reduce the amplitude of the "shear" signal at high roll angles.

In the illustrated embodiment, the function generator generates a signal whose amplitude is a function of the roll angle, $\phi$. For roll angles between plus and minus 15 degrees, the amplitude of the signal from the function generator 76 is 1 unit. Thus, when the "shear" signal is multiplied by the output of the function generator 76, the value of the shear signal is not changed. However, as the roll angle, $\phi$, increases in either direction beyond plus or minus 15 degrees, the amplitude of the signal from the function generator 76 decreases until the amplitude of the output signal is reduced to 0.5 unit at a roll angle, $\phi$, of plus or minus 60 degrees. Thus, the "shear" signal is multiplied by a factor of 0.5 by the multiplier 78 and the sensitivity of the system is reduced.

As previously stated, the roll angle $\phi$ can be obtained from a vertical gyro. It may also be derived from the rate of change of aircraft heading. For example, if the aircraft is in a heading of $\Psi$ degrees, the rate of change of heading becomes $\dot{\Psi}$. Since it is desired to make the system independent of a vertical gyro signal, the second method is preferred.

In a steady coordinated turn, the rate of change of heading, $\Psi$, is related to the roll angle, $\phi$, by:

(12) $\dot{\Psi}=(g/v) \tan \phi$ (13) $\cos \phi=(1/1+\tan^2 \phi)$

Substituting:

$$\cos \phi = 1/\sqrt{1 + (v\dot{\psi}/g)^2} \quad (14)$$

Thus, $\cos \phi$ signal may be obtained without using a gyro. Also, the rate of change of heading, $\dot{\Psi}$, could be used with an appropriate function generator to desensitize the system directly without computing roll angle, $\phi$.

In the wind shear system described above, some simplifying assumptions were made which could result in certain inaccuracies under extreme flight conditions, particularly in high bank angle turns and dynamic maneuvers. To compensate for such flight conditions certain modifications can be made to the above described system.

The main difference between the system described above and a system modified to permit extreme maneuvers lies in the fact that, in the modified system, the accelerations of the shear equation are calculated along the velocity vector of the aircraft rather than along the horizontal axis of the earth.

The modified system can be implemented either with or without the small angle approximation that was discussed above in conjunction with the system of FIG. 2. If no small angle approximation is made, large angles (angle of attack, pitch, roll and or flight path angle) will not result in degraded accuracy.

Figures 3, 4:
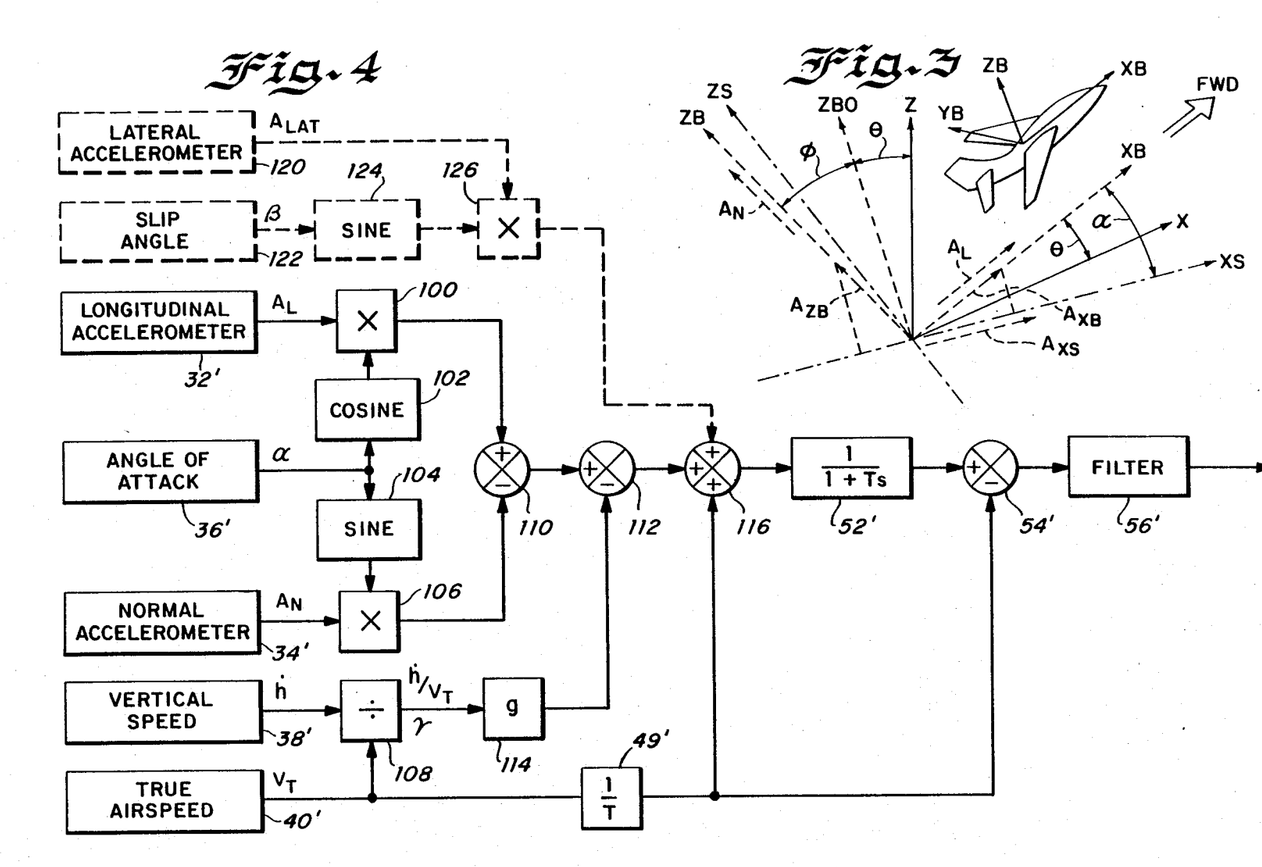
FIG. 3 is a vector diagram illustrating the relationship between various parameters utilized in detecting a wind shear condition along the velocity vector of an aircraft.
FIG. 4 is a block diagram illustrating logic circuitry that is responsive to a wind shear condition long the velocity vector of the aircraft.

The coordinate systems used to define the wind shear parameters and equation are shown in FIG. 3, and the mathematical derivations presented below are based on the assumption that the aircraft flies coordinated, that is, at a sideslip angle (beta) of approximately zero.

As shown in FIG. 3 the following coordinate systems have been defined:
  Earth coordinates:
  X-axis=horizontal
  Z-axis=vertical
  Coordinate system relative to the aircraft body:
  XB=aircraft longitudinal axis or roll axis
  ZB=aircraft normal axis or yaw axis
  Relative wind coordinates (stability axes for zero sideslip angle):
  XS=velocity vector
  ZS=normal to velocity vector The reason for utilizing three coordinate systems is that the input variables required to compute the wind shear equation are referenced in three coordinate systems as follows:

Vertical speed ($\dot{h}$) and gravity acceleration (g) are referenced to the earth vertical axis (Z);

The normal accelerometer is aligned with the aircraft normal axis (ZB-axis), whereas the longitudinal accelerometer is aligned with the aircraft roll axis (XB-axis); The angle of attack is defined as the angle between the aircraft roll axis (XB-axis) and the velocity vector (XS-axis). The airspeed as well as airspeed rate are measured along the velocity vector (XS-axis).

Because of the zero sideslip (beta=O) assumption, the Y-axis is not presently considered.

In order to determine the shear equations using the above three coordinate systems, first the body axis accelerations $A_{XB}$ and $A_{ZB}$ are projected onto the XS-axis thus calculating the acceleration along the velocity vector, $A_{XS}$. Since the velocity vector lies in a plane formed by the body axis and displaced from the XB-axis by an angle equal to angle of attack (body angle of attack $\alpha$), $A_{XS}$ can be calculated as shown in equation (15) below from the body axis accelerations and angle of attack ($\alpha$) as follows:

(15) $A_{XS}=A_{XB} \cos \alpha - A_{ZB} \sin \alpha$

The body axis accelerations are measured by the normal and longitudinal accelerometers. The accelerometer signals; however, include gravity effects which have to be subtracted to yield the desired body axis accelerations. The gravity effects on the accelerometers are a function of pitch ($\theta$) and roll ($\phi$) and the gravity acceleration constant "g" (32.2 feet/sec*sc) and are calculated in equations (16) and (17) below which show the body mounted accelerometer readings, $A_L$ and $A_N$, in terms of acceleration along the velocity vector and normal velocity vector and pitch and roll angles:

(16) $A_L=A_{XB}+g \sin \theta$ (17) $A_N=A_{ZB}+g \sin \theta \sin \phi$.

Rearranging:

(18) $A_{XB}=A_L-g \sin \theta$ (19) $A_{ZB}=A_N-g \cos \theta \sin \phi$.

Substituting equations (18) and (19) into equation (15) yields the acceleration along the velocity vector $A_{XS}$ as a function of the accelerometer signals $A_L$ and $A_N$ and angle of attack ($\alpha$) and attitude ($\theta$ and $\phi$) angles as shown in equation (20).

$$A_{XS} = A_L \cos\alpha - A_N \sin\alpha - g \sin\theta \times \cos\alpha + g \cos\theta \cos\phi \sin\alpha. \quad (20)$$

It is desirable to express the acceleration along the velocity vector without relying on pitch and roll signals in order to be unaffected by attitude errors inherent in vertical gyros. Equation (21) below expresses the functional relationship between pitch and roll angles and other flight parameters for the case of no up/down draft conditions.

$$\dot{h}/v = [\cos\alpha \cos\beta \sin\theta - \sin\beta \sin\phi \cos\theta \sin\alpha \cos\beta \cos\theta \cos\phi] \quad (21)$$

The relationship shown in equation (21) is the general form of the relationship that assumes a sideslip angle $\beta$. This relationship may be simplified if zero sideslip angle is assumed ($\beta=0$). Thus, simplified relationship is shown in equation (22) below:

(22) $\dot{h}/v = \cos\alpha \sin\theta - \sin\alpha \cos\theta \cos\phi$

Rearranging equation (22) yields equation (23) $\cos\alpha \sin\theta = \dot{h}/v + \sin\alpha \cos\theta \cos\phi$ Substitution of Equation (23) into equation (20) yields equation (24)

(24) $A_{XS} = A_L \cos\alpha - A_N \sin\alpha - g(\dot{h}/v)$

Equation (24) expresses the acceleration along the velocity vector as a function of normal and longitudinal acceleration, $\alpha$, vertical speed and airspeed. As intended, the attitude variables pitch and roll which require a vertical gyro have been eliminated.

Wind shear is defined as being the difference between the accelerometer derived acceleration along the velocity vector and the rate of change of airspeed. Preferably equation (24) is used to define the accelerometer derived acceleration along the velocity vector, $A_{XS}$, to avoid the need for a vertical gyro but other relationships may be used to define $A_{XS}$, for example the relationship expressed in equation (20). The rate of change of airspeed may be obtained by differentiating an airspeed signal such as true airspeed available from the aircraft air data system. This definition is expressed by the "shear" equation (25) below:

(25) shear$=A_{XS}-\dot{v}=A_L \cos\alpha - A_N \sin\alpha - g(\dot{h}/v) - \dot{v}$.

Equation (25) consists of a mix of inertial and airmass derived variables. Inertial variables are the normal and longitudinal acceleration signals as well as the vertical speed signal. Airmass derived variables are airspeed rate and airspeed as well as angle of attack. The term ($\dot{h}/v$) in equation (25) can be considered to be a pseudoinertial flight path angle because vertical speed ($\dot{h}$) is essentially an inertial signal representative of the actual vertical velocity of the aircraft (even though it may be derived from a barometric altimeter or an air data computer instead of an inertial navigation system), whereas airspeed ($v$) is airmass derived.

Due to this mix of inertial and airmass derived variables the shear equation responds to changes in wind velocity as well as to up or downdrafts. In no-shear conditions the acceleration term of equation (24) $A_{XS}$, is equal to airspeed rate, and the shear term in equation (25) is zero. In an increasing performance shear caused by an increasing headwind, $A_{XS}$ and airspeed rate are not equal and the value of the shear equation (25) is negative. Likewise, in an increasing performance shear due to an updraft, the angle of attack increase caused by the updraft is not matched by a corresponding decrease in vertical speed because angle of attack responds to the airmass whereas vertical speed is an inertial signal. This mismatch results in a negative $A_{XS}$ term which is reflected also in a negative shear equation output. Decreasing performance shears either due to decreasing headwinds, increasing tailwinds and or downdrafts will result in a positive value for shear equation (25).

A small angle approximation can be applied to equation (25) resulting in a simplified shear equation (26).

(26) shear$=A_L - A_N \alpha - g(\dot{h}/v) - \dot{v}$

In the above description of the derivation of the shear equation along the velocity vector, accelerations and airspeed rates were utilized because the concept can be clearly illustrated utilizing accelerations and airspeed rates. However, a system that calculates wind shear along the velocity vector utilizing airspeed rather than airspeed rate may also be implemented. One such implementation is illustrated in FIG. 4.

In the system illustrated in FIG. 4, a longitudinal accelerometer 32', a normal accelerometer 34', an angle of attack circuit 36', a vertical speed signal source 38' and a true airspeed signal source 40' are employed. The sources 32', 34', 36', 38' and 40' are analogous to the respective sources 32, 34, 36, 38 and 40 illustrated in FIG. 2, and previously discussed. In the system illustrated in FIG. 4, the longitudinal accelerometer signal is multiplied by the cosine of the angle of attack signal by a multiplier 100 which receives the longitudinal acceleration signal from the longitudinal accelerometer 32' and the the cosine of the angle of attack, which is received from a cosine function generator 102 which receives the signal from the angle of attack circuitry 36'. The angle of attack signal from the angle of attack circuitry 36' is also applied to a sine function generator 104 to provide a signal representative of sine of the angle of attack. The sine of the angle of attack is multiplied by the normal accelerometer signal by a multiplier 106. In the event that a small angle approximation is desired, the cosine function generator 102 and the sine function generator 104 may be eliminated and the signal from the angle of attack vane 36' may be applied directly to the multipliers 100 and 106.

The vertical speed signal from the vertical speed signal source 38' and the true airspeed from the true airspeed signal source 40' are applied to a divider 108. The divider 108 divides the vertical speed by the true airspeed to generate the flight path angle $\gamma$ at its output.

The signal from the multiplier 106 is subtracted from the signal from the multiplier 100 by a summing junction 110 to provide a difference signal representing the difference between the normal and longitudinal accelerations along the ZS and XS (stability) axes. The difference signal is then subtracted from the flight path angle signal by a summing junction 112. A normalizing function generator 114 multiplies the output of the divider 108 by g or 32.2 feet per second per second to normalize the computation in terms of feet per second per second; however, the computations can also be made in terms of g's. The signal from the summing junction 112 is then added to the true airspeed signal (as filtered by a filter 49') from the true airspeed signal source 40' by means of a summing junction 116. The output of the summing junction 116 is integrated by a filter 52', analogous to the filter 52 of FIG. 2. A summing junction 54', similar to the summing junction 54, subtracts the true airspeed signal provided by the true airspeed signal source 40 from the output of the filter 52'. The output of the summing junction 54' results in a "shear signal" that is filtered by a filter 56' similar to the filter 56. Thus, the system illustrated in FIG. 4 results in a shear equation (27) wherein:

$$\text{shear} = \frac{A_L \cos\alpha - A_N \sin\alpha - (h/v)g + (v/T)}{1 + Ts} - (v/T) \qquad (27)$$

wherein all accelerations are normalized to feet per second per second, but the equation may be normalized to other units, such as, for example, g's or metric units.

The above equation assumes that there is zero side lateral acceleration and zero slip angle. If it is desired to compensate for lateral accelerations and slip angles, a lateral accelerometer 120 that is mounted laterally in the aircraft perpendicular to the longitudinal and normal accelerometers may be used. In addition, a slip angle detector 122 which may be a side slip probe. By taking the sine of the slip angle from the slip angle detector 122, utilizing a sine function generator 124 and multiplying the sine of the slip angle by the lateral acceleration by means of a multiplying circuit 126 the error due to slip angles may be determined. The output of the multiplier 126 is then added to the summing junction 116 to generate a wind shear calculation that has been compensated for slip angles. The slip angle compensated wind shear equation is as follows:

$$\text{shear} = (A_L \cos\alpha - A_N \sin\alpha - (h/v)g + \qquad (28)$$

$$(v/T) + A_{LAT} \sin\beta)(1/(Ts + 1) - (v/T)$$

wherein the equation has been normalized in terms of feet per second per second as in the case of equation (27). While not illustrated in FIG. 4, equations (27) and (28) may be compensated for roll altitude and radio altitude in the same manner as the shear signal generated in FIG. 2.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A wind shear detection system for an aircraft comprising:
   means for receiving a longitudinal accelerometer signal;
   means for receiving a normal accelerameter signal;
   means for receiving a signal representative of the air speed of the aircraft;
   means for receiving a signal representative of the flight path angle of the aircraft;
   means for receiving a signal representative of the angle of attack of the aircraft;
   means for multiplying the normal accelerometer signal with the sum of the flight path angle and angle of attack representative signals, taking the difference between the resulting product and the sum of the longitudinal accelerometer signal and the airspeed representative signal and integrating the difference to provide a composite signal; and
   means for comparing the signal representative of airspeed with the composite signal and generating a signal representative of the difference therebetween indicative of wind shear.

2. The system recited in claim 1 further including means responsive to said comparing means for providing an alert is the difference between the airspeed and composite signals exceeds a predetermined amount.

3. The system recited in claim 1 further including means for receiving a signal representative of the roll angle of the aircraft, and for modifying said composite signal as a function of the roll angle.

4. A wind shear detection system as recited in claim 1, further including means for providing a signal representative of the flight path angle of the aircraft, said flight path angle representative signal providing means comprising:
   means for receiving a signal representative of the vertical speed of the aircraft and the airspeed representative signal and for generating the signal representative of the aircraft flight path angle according to the relative values of the airspeed and vertical speed representative signals, the airspeed representing a horizontal component of the flight path angle and the vertical speed representing a vertical component of the flight path angle.

5. A wind shear detection system as recited in claim 4 wherein said flight path angle representative signal is generated by dividing the signal representative of the vertical speed by the signal representative of the airspeed of the aircraft.

6. A wind shear detection system for an aircraft comprising:
   first means for receiving a signal representative of the longitudinal acceleration of the aircraft, $A_L$;
   second means for receiving a signal representative of the normal acceleration of the aircraft, $A_N$;
   third means for receiving a signal representative of the flight path angle $\gamma$ of the aircraft;
   fourth means for receiving a signal representative of the angle of attack $\alpha$ the aircraft;
   fifth means for providing a signal representative of the airspeed of the aircraft, $v$; and
   sixth means responsive to said first, second, third, fourth and fifth means for providing a signal representative of the wind shear according to the following relationship:

$$\text{shear} = \frac{A_L - A_N(\alpha + \gamma) + (v/T)}{1 + Ts} - (v/T)$$

wherein s is the LaPlace operator and T is the integration time constant.

7. A method for detecting wind shear encountered by an aircraft comprising:
   providing a longitudinal accelerometer signal;
   providing a normal accelerometer signal;

providing a signal representative of the airspeed of the aircraft;

providing a signal representative of the flight path angle of the aircraft;

providing a signal representative of the angle attack of the aircraft;

multiplying the normal accelerometer signal and the sum of the flight angle and angle of attack representative signals and taking the difference between the resulting product and the sum of the longitudinal accelerometer signal and the airspeed representative signal, and integrating the result to provide a composite signal; and comparing the signal representative of the airspeed with the composite signal and generating a signal representative of the difference therebetween indiciative of wind shear.

8. The method recited in claim 7, further including providing an alert if the difference between the airspeed and composite signals exceeds a predetermined amount.

9. The method recited in claim 7, further including providing a signal representative of the roll angle of the aircraft and modifying said composite signal as a function of the roll angle.

10. A wind shear detection system for an aircraft comprising:

first means for receiving a signal representative of the longitudinal acceleration of the aircraft, $A_L$;

second means for receiving a signal representative of the normal acceleration of the aircraft, third means for receiving a signal representative of the vertical velocity, h, of the aircraft;

fourth means for receiving a signal representative of the angle of attack $\alpha$ the aircraft;

fifth means for providing a signal representative of the airspeed of the aircraft, v; and sixth means responsive to said first, second, third, fourth and fifth means for providing a signal representative of the wind shear according to the following relationship therebetween:

shear = $A_L \cos \alpha - A_N \sin \alpha - g(\dot{h}/v) - \dot{v}$ wherein g is the gravitational constant and $\dot{v}$ is the rate of change of v.

11. A wind shear detection system for an aircraft comprising:

first means for receiving a signal representative of the longitudinal acceleration of the aircraft, $A_L$;

second means for receiving a signal representative of the normal acceleration of the aircraft, $A_N$;

third means for receiving a signal representative of the vertical velocity, h, of the aircraft;

fourth means for receiving a signal representative of the angle of attack $\alpha$ the aircraft;

fifth means for providing a signal representative of the airspeed of the aircraft, v; and sixth means responsive to said first, second, third, fourth and fifth means for providing a signal representative of the wind shear according to the following relationship therebetween:

$$\text{shear} = \frac{A_L \cos\alpha - A_N \sin\alpha - (\dot{h}/v)g + (v/T)}{1 + Ts} - (v/T)$$

wherein g is the gravitational constant, s is the LaPlace operator and T is the integration time constant.

12. A wind shear detection system for an aircraft, comprising:

means for providing an accelerometer derived acceleration signal along the velocity vector, $A_{XS}$, of the aircraft and an airmass derived signal along the velocity vector; and means for comparing the accelerometer derived acceleration along the velocity vector and the airmass derived signal along the velocity vector for providing a shear signal in response to the difference therebetween, indicative of wind shear, wherein said means for providing the accelerometer derived acceleration signal along the velocity vector, $A_{XS}$, includes means for deriving the accelerometer derived acceleration signal along the velocity vector fror a longitudinal accelerometer signal, $A_L$, a normal accelerometer signal $A_N$, a signal representative of the aircraft angle of attack, $\alpha$, a signal representative of the aircraft vertical speed $\dot{h}$, and a signal representative of airspeed v, and for deriving the airmass derived signal from the airspeed signal v, and wherein the accelerometer derived acceleration signal along the velocity vector, $A_{XS}$, is derived according to the following relationship:

$$A_{XS} = A_L \cos\alpha - A_N \sin\alpha - g(\dot{h}/v)$$

where g is the gravitational constant.

13. A wind shear detection system for an aircraft, comprising:

means for providing an accelerometer derived acceleration signal along the velocity vector, $A_{XS}$, of the aircraft and an airmass derived signal along the velocity vector; and means for comparing the accelerometer derived acceleration along the velocity vector and the airmass derived signal along the velocity vector for providing a shear signal in response to the difference therebetween indicative of wind shear, wherein said means for providing the accelerometer derived acceleration signal along the velocity vector, $A_{XS}$, includes means for deriving the accelerometer derived acceleration signal from a longitudinal accelerometer signal, $A_L$, a normal accelerometer signal $A_N$, a signal representative of the aircraft angle of attack, $\alpha$, a signal representative of aircraft pitch angle, $\theta$, a signal representative of aircraft roll angle, $\phi$, and for deriving the airmass derived signal from a signal, v, representative of airspeed, wherein the accelerometer derived acceleration signal along the velocity vector, $A_{XS}$, is derived according to the following relationships:

$$A_{XS} = A_L \cos\alpha - A_N \sin\alpha - g \sin\theta \cos\alpha + g \cos\theta \cos\phi \sin\alpha$$

where g is the gravitational constant.

14. A method for detecting wind shears encountered by an aircraft, comprising:

providing inertially derived and airmass derived signals along the velocity vector of the aircraft; and comparing the inertially derived and airmass derived signals along the velocity vector to generate a wind shear signal, wherein the inertially derived signal along the velocity vector, $A_{XS}$, is derived form a longitudinal accelerometer signal, $A_L$, a normal accelerometer signal, $A_N$, and a signal representative of the aircraft angle of attack, $\alpha$, and the airmass derived signal along the velocity vector is derived form a signal representative of airspeed, v, and wherein the inertially derived signal along the velocity vector, $A_{XS}$, is further derived from a signal representative of vertical speed, $\dot{h}$, and from the signal representative of airspeed, v, according to the following relationship:

$$A_{XS} = A_L \cos\alpha - A_N \sin\alpha - g(\dot{h}/v).$$

15. A method for detecting wind shears encountered by an aircraft, comprising:
providing inertially derived and airmass derived signals along the velocity vector of the aircraft; and
comparing the inertially derived and airmass derived signals along the velocity vector to generate a wind shear signal, wherein the inertially derived signal along the velocity vector, $A_{XS}$, is derived from a longitudinal accelerometer signal, $A_L$, a normal accelerometer signa, $A_N$, a signal representative of the angle of attack of the aircraft, $\alpha$, a signal representative of the pitch angle of the aircraft, $\theta$, and a siganl representative of the roll angle of the aircraft $\phi$ according to the following relationship:

$$A_{XS} = A_L \cos\alpha - A_N \sin\alpha - g \sin\theta \cos\alpha + g \cos\theta \cos\phi \sin\alpha$$

wherein g is the gravitational constant.

* * * * *